Aug. 1, 1967  E. J. DE WITT  3,333,488
ANNULAR DRILLING MACHINE
Filed Jan. 18, 1965  4 Sheets-Sheet 1
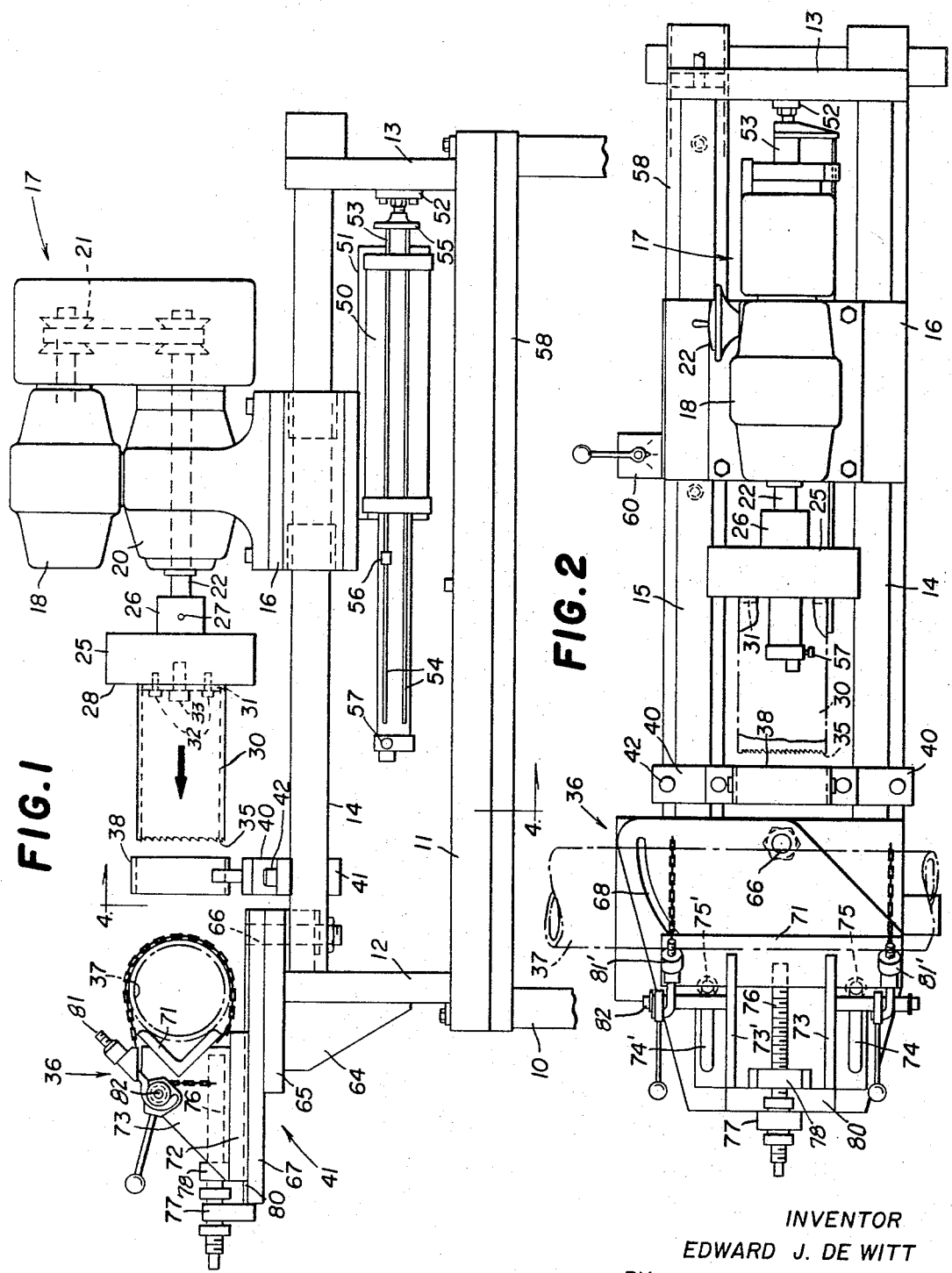
INVENTOR
EDWARD J. DE WITT
BY
Trent, Lockwood,
Grunewalt & Dewey
ATTYS.

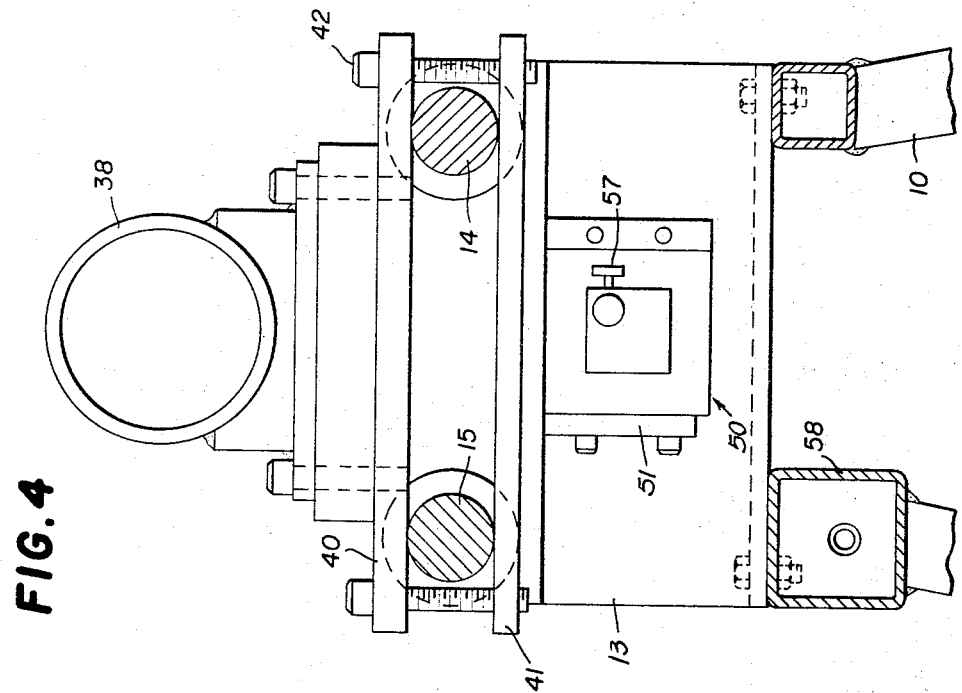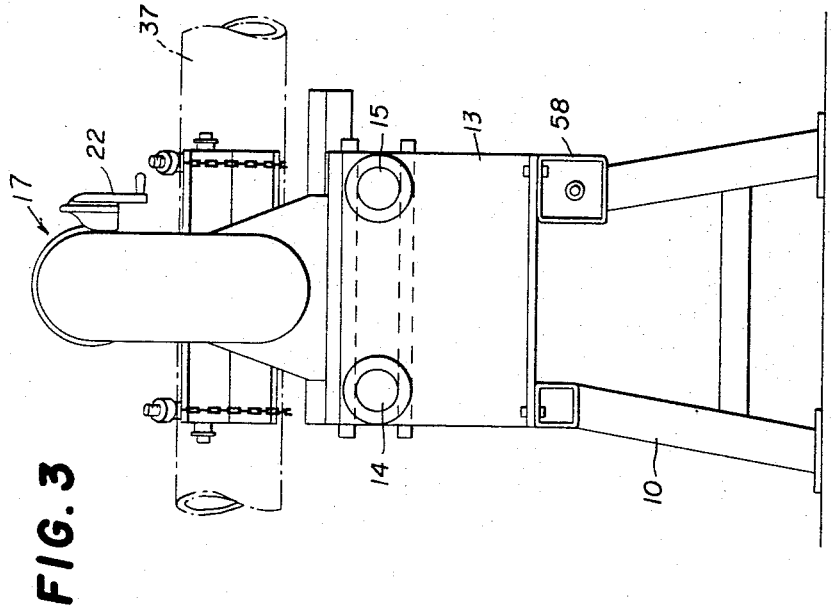

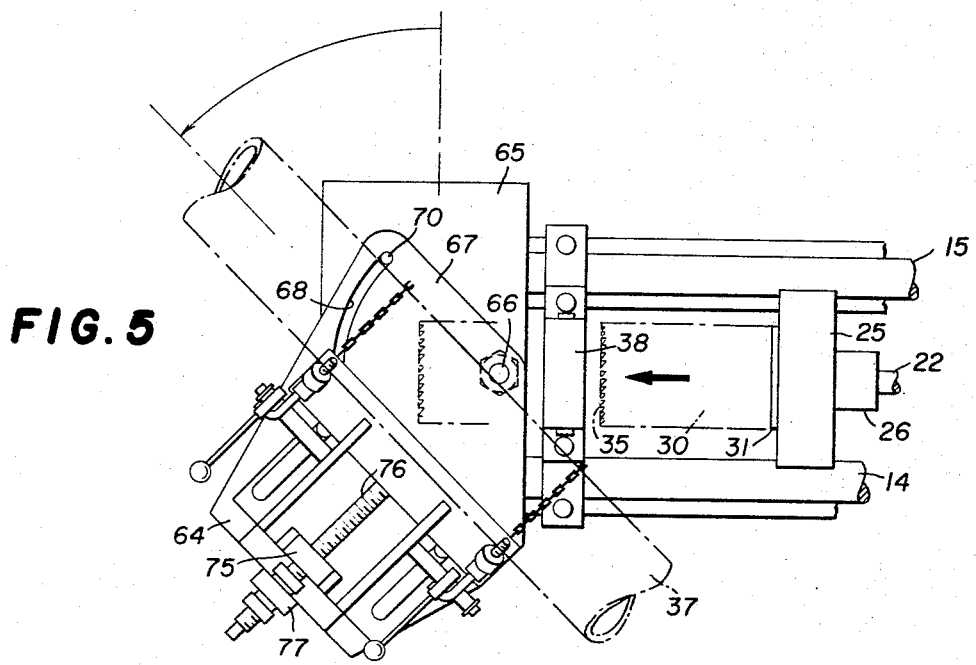
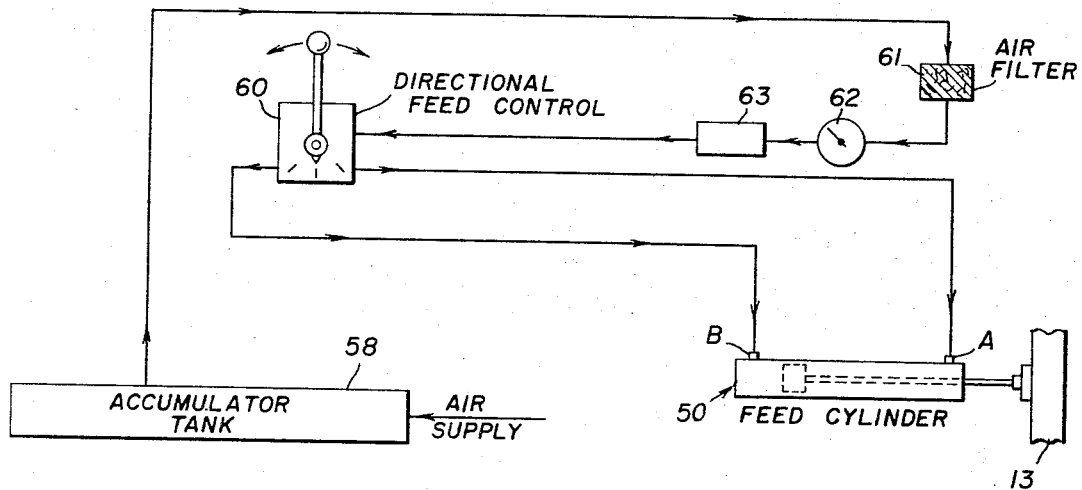

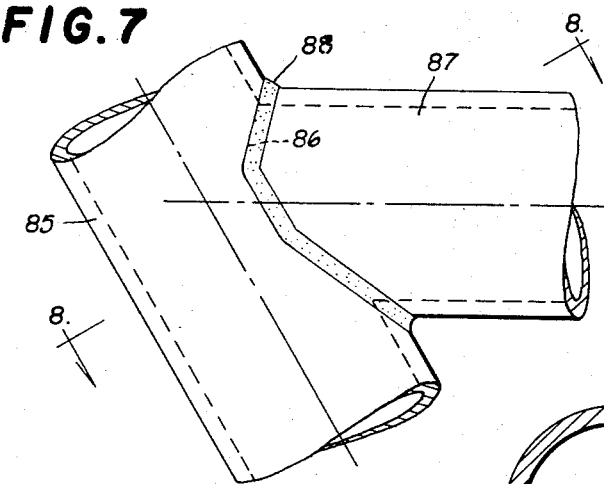
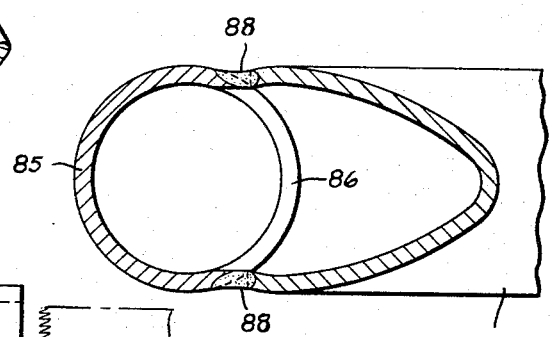
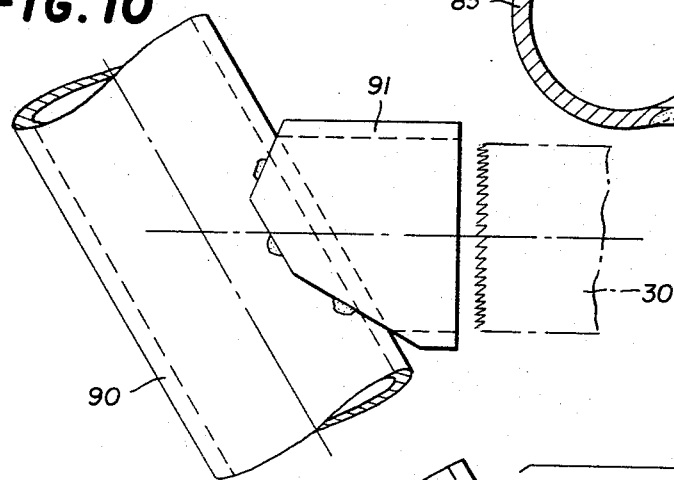
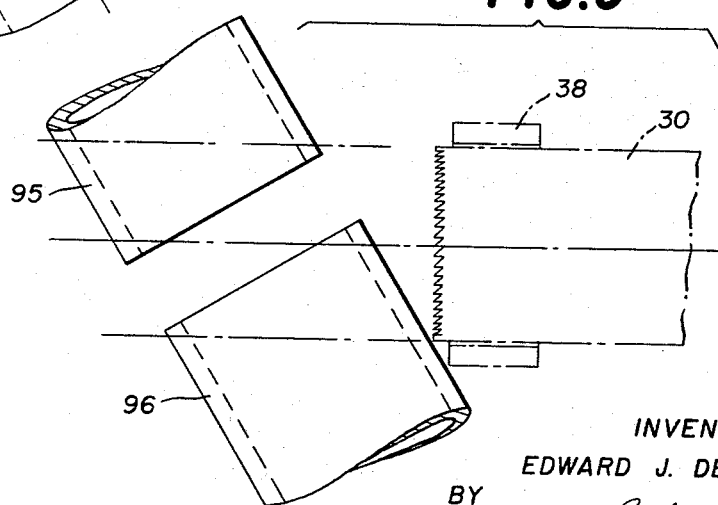

United States Patent Office 3,333,488
Patented Aug. 1, 1967

3,333,488
ANNULAR DRILLING MACHINE
Edward J. De Witt, Winnetka, Ill., assignor to Wallace Supplies Manufacturing Company, Chicago, Ill., a corporation of Illinois
Filed Jan. 18, 1965, Ser. No. 426,223
6 Claims. (Cl. 77—5)

This invention relates to the cutting of materials and is more particularly concerned with improvements in machinery for cutting tubing and other materials in preparation for forming joint structures.

It is a general object of the invention to provide improvements in equipment for making cuts of circular cross section in structural members such as tubing, bars, plates or the like so as to permit joints of various kinds to be made between such members with fewer operations and in less time than possible with the equipment heretofore available.

It is a more specific object of the invention to provide improvements in apparatus for cutting a circular hole in a tube, bar, plate or other structural member wherein the cut is made by moving a cylindrical cutting blade on an axial path which is normal to the longitudinal axis or the plane of the face of the workpiece, or which is at any reasonable predetermined angle relative thereto.

It is another object of the invention to provide a machine for cutting structural members so as to prepare them for forming structural or fluid joints wherein a cutting blade is employed which is in the form of an elongate cylindrical section mounted at one end on a rotatable arbor with a circle cutting edge at its opposite end and with the arbor mounted so as to be moved in an axial direction at a predetermined speed towards a clamping device by which the member to be cut is rigidly held and with a guide for the cutting blade which supports the cutting end of the blade in telescoping rotatable relation so as to hold it in axial alignment with the supporting arbor while the cutting edge engages and cuts the workpiece.

It is another object of the invention to provide apparatus for cutting tubes, bars, plates or other structural members so as to provide a circular hole therein for the passage of fluid material or a circular surface on an end or edge of the member for co-operation with a like surface on another member so as to form a joint, which apparatus includes a cutting blade in the form of an elongate cylinder adapted to be mounted at one end in axially aligned relation on a rotating arbor and having at its free end a peripheral wall section terminating at a cutting edge which cutting edge is held against sidewise travel or skidding when advanced in the direction of its axis and into cutting position by means of a fixed sleeve-like guide member which rotatably supports the cutting edge and which is positioned closely adjacent to the area in which the cut is made.

It is a still further object of the invention to provide a machine for cutting a circular hole in a workpiece which comprises an upright supporting frame having a clamping device for a workpiece at one end thereof and a reciprocable carriage mounted thereon with a power driven arbor on the carriage which is adapted to receive a cutting tool in the form of a cylinder having a cutting edge at one end and an arbor attaching device at the other end and a ring shaped guide mounted adjacent the workpiece clamping device for steadying the blade as it is advanced and the cutting edge is brought into engagement with the workpiece.

These and other objects and advantages of the invention will be apparent from a consideration of the cutting machine and methods which are shown by way of illustration in the accompanying drawings wherein:

FIGURE 1 is a side elevation, with portions broken away, of a material cutting machine which is designed to be used in practicing the invention;

FIGURE 2 is a plan view of the machine of FIGURE 1;

FIGURE 3 is an end elevation of the machine;

FIGURE 4 is a cross section taken on the line 4—4, to an enlarged scale;

FIGURE 5 is a partial plan view with the work clamping device in a different position;

FIGURE 6 is a schematic view of the air system for controlling the movement of the carriage which supports the arbor and its drive mechanism;

FIGURE 7 is a plan view illustrating a branched pipe joint which is formed according to the invention;

FIGURE 8 is a section taken on the line 8—8 of FIGURE 7;

FIGURE 9 is a plan view illustrating the positioning of two pieces of pipe preparatory to cutting the ends thereof in preparation for forming joints; and FIGURE 10 is a view illustrating a modified procedure for cutting a hole in a main pipe in preparation for forming a branched joint according to the invention.

The invention is illustrated in connection with the preparation of tubular members for joining an end of one tubular member to another tubular member so that the interior of the one is in communication with the interior of the other and fluid material may pass freely through the joint when the members are welded or otherwise permanently connected. The invention is also applicable to the formation of structural joints and to the preparation of bars, angle members and the like for joining to the wall of a tube or other cylindrical surface and the joints may be made with the members connected at any angle desired. Also, the members may be different sizes, of different thickness and of different materials such as steel, stainless steel, brass, copper, aluminum, alloys, plastics or the like.

Referring first to FIGURES 1 to 6 of the drawings, there is illustrated a machine which is especially adapted for cutting tubular members to provide the joint structures which are possible in practicing the invention. The illustrated machine comprises an upright supporting frame structure 10 with a horizontally disposed top 11 on which parallel, upstanding end members 12 and 13 are mounted and between which extend parallel rods or bars 14 and 15 providing ways for a reciprocable carriage 16 having a power drive assembly 17 mounted thereon. The power drive assembly 17, which is illustrated, comprises an electric motor unit 18 and a power output unit 20 with a variable speed drive mechanism in the connecting housing 21. The drive motor unit 18 is mounted above the power output unit 20 and the latter is secured on the carriage 16. A power output shaft 22 extends from the power output unit and forms an arbor for a cutting tool. The arbor forming shaft 22 has mounted thereon a cylindrical tool mounting section or disc 25 with a hub forming portion 26 extending from the rear face thereof which is keyed to the arbor shaft 22 and secured by a set screw 27. The forward face 28 is adapted to receive thereon a cutting tool or hole saw 30 which is in the form of a cylindrical section with a mounting plate 31 secured in one end and suitably apertured for stud bolts 32 and a centering bolt 33 which insures axial alignment of the cutting tool 30 with the shaft 22. The cutting tool or hole saw 30 has a saw tooth cutting edge 35 at its leading end and extends in the direction of a work clamp assembly 36 which is adapted to clamp a piece of pipe, or the like, indicated at 37, in the proper position for cutting by the tool 30. A tool or saw guide and support member 38, in the form of a short cylindrical or tubular section, is mounted on a bracket 40 extending between the guide rods 14 and 15. The bracket 40 has a clamp forming lower plate 41 which may be tightened by turning the stud bolts 42 connecting the same to the main body of bracket 40. The saw guide 38 is positioned at the proper elevation and disposed between the guide rods 14 and 15 so as to bring it in axial alignment with the saw member 30. The guide sleeve 38 has an internal diameter slightly greater than the external diameter of the saw member 30 so as to accommodate the latter while holding the same in alignment and preventing excessive vibration as the saw is advanced into engagement with the workpiece 37.

The carriage 16 has a mechanism for advancing the same which comprises an air cylinder assembly 50 having incorporated therein a hydraulic check system. The air cylinder assembly 50 is mounted on a frame forming plate 51 secured in depending relation beneath the carriage 16. A bracket 52 secures the end of the piston 53 to the upright frame plate 13 at the trailing end of the machine. A pair of guide rods 54 extend parallel with the air cylinder 50 from a bracket 55 and a cutting feed trip member, indicated at 56, is adjustably mounted on one of the rods 54 for engagement by the forward end of the cylinder 50. A speed control valve 57 is mounted on the forward end of the hydro check portion of the cylinder assembly 50 within convenient reach of the operator and an air accumulator tank 58 is incorporated in the frame at one side of the top frame portion 11 and connected to an air supply. A manually operated control valve 60 is mounted on one side of the carriage 16 for convenient operation by the operator. As indicated in FIGURE 6, the air system includes the usual filter 61, gauge 62 and lubricator 63. The air cylinder assembly 50, which is illustrated, is a well known commercial unit supplied by Air Control, Inc., Chicago, Illinois, and identified as its "Electro-Mechano" Outward Control Unit (A4-14).

The work clamp or vise assembly 36 at the leading end of the machine is mounted on a bracket 64 having a top plate 65 and connected by a pivot forming stud bolt 66 to the base plate 67 of the clamp or vise 36, the latter having an arcuate slot 68 which accommodates a stop pin 70 and limits the angular movement of the vise. The vise comprises a jaw member 71 of angular cross section which is secured to a base plate 72 by a pair of parallel upright side plates 73 and 73'. The base plate 72 has parallel slots 74 and 74' for receiving cooperating pins 75 and 75' upstanding from the bottom or base plate 67. An adjusting screw 76 is axially rotatable in an upstanding bracket member 77 on the base plate 67 and is in threaded engagement with an upstanding plate 78 on the horizontal plate 72 so that by use of a proper tool for turning the screw 76 the plate 72 may be adjusted on the base plate 67 with the plate 72 being held in proper alignment by a tongue and groove connection indicated at 80. Two conventional toggle chain-type clamp assemblies 81 and 81' are mounted on supporting pins 82 and 82' extending from the side plates 73 and 73' so as to accommodate workpieces of different shape. The machine is illustrated with a pipe section 37 clamped in position for boring a straight hole in FIGURE 2, while in FIGURE 5 the clamp assembly 36 is adjusted for boring a hole in the pipe section 37 at an angle relative to the long axis of the pipe section.

The machine 10, as illustrated in FIGURES 1 and 2, is set up for cutting a circular hole, with the pipe section 37 rigidly clamped in position so that its longitudinal axis is at a right angle relative to the path of approach of the blade 30. Rotation of the blade member 30 is begun by operating the controls on the drive motor 20 after which the control valve 60 for the feed is operated to advance the carriage 16. The carriage advances under the influence of the air cylinder assembly 50 with a fast approach stroke which will bring the blade 30 to a position for beginning the cut as predetermined by the setting of the feed trip 56. The rate of advance of the saw blade 30 may then be adjusted by operating the valve 57 on the air cylinder assembly 50. Preferably, the feed is started rather slowly and the speed increased until it appears that the motor is properly loaded. When the cut is completed the carriage 16 is quickly reversed by operation of the air cylinder assembly 50 under the control of the valve 60 after which the workpiece may be removed from the vise or clamp assembly 36.

The size of the hole saw member or blade 30 depends, of course, upon the diameter of the cut desired. Various size blades may be employed with a co-operating guide member 38 of the proper size for operation with the particular size saw blade 30, the machine being adapted to accommodate saw blades of different sizes within predetermined limits determined by the size of the machine and the power of the operating devices. The guide 38 may be made removable and replaceable by a guide of a different size or a relatively large guide support may be provided with suitable means for clamping therein guide inserts of the proper size for the blade which is being used.

The clamp assembly 36, as shown in FIGURE 5, enables the workpiece, which is illustrated as a section or piece of pipe 37, to be positioned at a predetermined angle relative to the path of the blade 30 so that the pipe wall is cut to provide a hole which has a diameter corresponding to the external diameter of the blade member 30. Consequently, a hole of any desired diameter may be cut in the wall of the tube by providing a blade of the proper size.

In preparing pipe members for forming a fluid joint such as the branch joint shown in FIGURES 7 and 8, the main pipe 85 is provided with a hole 86 cut therein as described with reference to the pipe section 37, a saw blade 30 being employed which has an external diameter corresponding to the internal diameter of the branch pipe 87 or slightly smaller. The end of the branch pipe 87 is cut to provide edge surfaces which will conform to the surface of the main pipe 85 at the desired location for the joint, so as to provide mating surfaces suitable for forming a proper weld or other fluidtight connection. The end of the branch pipe 87 may be cut in the manner described in my Patent No. 3,062,567 so as to provide a V-shaped groove suitable for receiving welding material indicated at 88 in FIGURES 7 and 8. The branch pipe end is positioned so as to align the hole 86 with the inside of the branch pipe 87 and the connection is welded to form a permanent joint which offers no appreciable obstruction to the flow of fluid from the branch pipe 87 into the main pipe 85. Alternatively, the end of the branch pipe 87 may be prepared by cutting the same with the machine 10, using the proper size blade 30. The branch pipe 87 is held in the clamp assembly 36 so that it is at the proper angle relative to the path of the blade 30 and a blade 30 having an external diameter corresponding to the external diameter of the main pipe 85 is employed so that the blade 30 traverses the end of the pipe 87 in making the circular cut and the end edges of the pipe resulting from the cutting operation mate with the surface of the main pipe 85 and are in abutting relation for permanent connection. When a number of joints of the same size and angle are to be made, two pipe ends may be cut at one time with the machine, as illustrated schematically in FIGURE 9, by clamping the pipes 95 and 96 in axial alignment with the ends which are to be cut slightly spaced and making a cut with a single advance of the blade 30 on an axial line so as to traverse both pipe ends in one operation.

In preparing the members for forming the branch joint in FIGURES 7 and 8, a modified procedure may be employed, as illustrated in FIGURE 10. The main pipe 90 may be clamped or otherwise fixed in position and a short section of pipe 91 of the same size as the branch pipe may be cut so that the one end will have edge surfaces adapted to mate with the wall of the main pipe 90 when seated against the same. The short pipe section 91 may then be temporarily secured, by a tack weld or other temporary connection, in position where the joint is to be formed and used as a guide for cutting the hole in the main pipe, the machine 10 being employed for cutting the hole with the blade guide 38 removed and the blade 30 being axially aligned with the short pipe section 91 so that the latter serves as a guide for the blade 30 during the cutting operation, the blade 30 being of the proper size to advance through the pipe section 91 and to cut a hole in the wall of the main pipe 90 having a diameter only slightly less than the diameter of the pipe section 91. When the hole cutting operation is completed and the blade 30 withdrawn the pipe section 91 may be released by breaking the temporary connection and removed so as to permit the branch pipe which has been prepared for permanent connection to be substituted and permanently connected to form the completed joint.

While specific materials and particular details of construction have been referred to in describing form of the apparatus illustrated, it will be understood that other materials and different structural details may be resorted to within the spirit of the invention.

I claim:

1. A machine for cutting a circular hole comprising an upright supporting frame, a carriage reciprocably mounted on the frame which is movable toward and from a work clamping device disposed at one end of the frame, an arbor forming shaft rotatably supported on the carriage and drive means for rotating said arbor, a cutting tool in the form of a hollow cylinder having means at one end for securing the same in axial alignment on said arbor for rotation therewith and having a saw tooth cutting edge at the other end thereof for engaging with a workpiece held in said clamping device, a tool guiding member mounted on said device which is in the form of a relatively short hollow tubular section having an internal diameter slightly greater than the external diameter of said cutting tool and having a dimension in the axial direction which is less than the corresponding dimension of said cutting tool, said tool guiding member being disposed in axial alignment with said cutting tool so as to guide the same as it is moved therethrough to bring the cutting edge thereof into engagement with the workpiece, and power means for advancing the carriage in the direction of the clamping device so as to bring the cutting edge of the tool into engagement with the workpiece.

2. A machine as recited in claim 1, and said power means for advancing the carriage comprising a fluid operated cylinder and control means for said cylinder.

3. A machine for cutting a circular hole in a workpiece comprising a supporting frame, a carriage mounted for reciprocation in a horizontal path on said frame, a tool arbor journaled on the carriage for rotation about an axis parallel with the path of movement of the carriage, power means for driving the arbor, a cylindrical cutting tool, a flywheel-like disc on said arbor and means mounting thereon said cylindrical cutting tool with its long axis aligned with the axis of the arbor and with a saw tooth cutting edge at the free end thereof, a ring-like guide member mounted on the supporting frame in the path of the cutting tool with its axis in alignment with the axis of the cutting tool and having an internal diameter slightly greater than the external diameter of the cutting tool so as to form a vibration absorbing guide as the tool is advanced into engagement with the workpiece, and power means for advancing the tool for the cutting operation.

4. A machine for cutting a circular hole in a workpiece comprising an upright supporting frame, a carriage mounted for reciprocation in a horizontal path on said frame, a power unit mounted on the carriage having an arbor forming output shaft positioned for rotation about an axis parallel with the path of movement of the carriage, a cylindrical saw member, a relatively heavy disc on said arbor and means mounting thereon said cylindrical saw member with its long axis aligned with the axis of the arbor and with its cutting edge at the free end thereof, a sleeve-like guide member mounted on the frame in the path of the saw member with its axis in alignment with the axis of the saw member and having an internal diameter slightly greater than the external diameter of the saw member so as to form a steadying guide for the saw member as it is advanced into engagement with the workpiece, and power means for advancing the saw member for the cutting operation.

5. A machine for cutting a circular hole in a workpiece comprising an upright supporting frame, a carriage mounted for reciprocation in a horizontal path on said frame, an arbor rotatably mounted on the carriage with its axis parallel with the path of movement of the carriage, power driving means connected to the arbor, a flywheel-like disc on said arbor, a cylindrical cutting tool and means for mounting on the arbor said cylindrical cutting tool with its long axis aligned with the axis of the arbor and with a saw tooth cutting edge at the free end thereof, a short cylindrical guide member mounted on the frame in the path of the cutting tool with its axis in alignment with the axis of the cutting tool and having an internal diameter slightly greater than the external diameter of the cutting tool so as to form a guide for the tool as it is advanced into engagement with the workpiece, and power means for advancing the tool for the cutting operation.

6. A machine for cutting a circular hole in a workpiece comprising a supporting frame having a work clamping device disposed at one end and a carriage reciprocably mounted thereon for movement towards and from the work clamping device, a tool arbor rotatably mounted on the carriage and power means for rotating said arbor, a cutting blade, a relatively heavy disc member in the form of a flywheel mounted on said arbor and having means for securing said cutting blade on the face thereof, said cutting blade being in the form of a tubular section with the long axis of the blade aligned with the axis of the arbor and power means for reciprocating the carriage to bring the cutting blade into engagement with the workpiece.

References Cited

UNITED STATES PATENTS

| 294,628 | 3/1884 | Jenkins | 144—15 |
| 887,308 | 5/1908 | Bryan | 77—42 |
| 2,881,643 | 4/1959 | Haade | 77—42 |
| 2,972,915 | 2/1961 | Milanovits, et al. | 77—42 |

FOREIGN PATENTS

| 507,098 | 9/1939 | Great Britain. |
| 299,127 | 10/1928 | Great Britain. |

FRANCIS S. HUSAR, *Primary Examiner.*